United States Patent
Edwards et al.

(10) Patent No.: US 9,165,034 B2
(45) Date of Patent: Oct. 20, 2015

(54) HETEROGENEOUS DATA SOURCE MANAGEMENT

(75) Inventors: Nigel Edwards, Bristol (GB); Johannes Kirschnick, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 305 days.

(21) Appl. No.: 13/259,498

(22) PCT Filed: Oct. 15, 2009

(86) PCT No.: PCT/US2009/060923
§ 371 (c)(1),
(2), (4) Date: Sep. 23, 2011

(87) PCT Pub. No.: WO2011/046560
PCT Pub. Date: Apr. 21, 2011

(65) Prior Publication Data
US 2012/0030220 A1     Feb. 2, 2012

(51) Int. Cl.
*G06F 7/00* (2006.01)
*G06F 17/30* (2006.01)

(52) U.S. Cl.
CPC .... *G06F 17/30474* (2013.01); *G06F 17/30221* (2013.01)

(58) Field of Classification Search
CPC .................................................. G06F 17/30221
USPC ......................................................... 707/792
See application file for complete search history.

(56) References Cited

U.S. PATENT DOCUMENTS

| 5,953,716 | A  | 9/1999  | Madnick et al. |
| 6,282,537 | B1 | 8/2001  | Madnick et al. |
| 6,327,586 | B1 | 12/2001 | Kisiel          |

(Continued)

FOREIGN PATENT DOCUMENTS

| EP | 1039398 A2 | 9/2000 |
| KR | 10-2001-0083845 A | 9/2001 |

(Continued)

OTHER PUBLICATIONS

International Search Report and Written Opinion for PCT Application No. PCT/US2009/060923, mailed Jul. 9, 2010, pp. 10.

*Primary Examiner* — Ajith Jacob
(74) *Attorney, Agent, or Firm* — Hewlett-Packard Patent Department

(57) ABSTRACT

Management of heterogeneous data sources is described. In accordance with an embodiment method, a plurality of heterogeneous data sources is identified (410). The plurality of heterogeneous data sources can represent static data sources and management data streams received from servers for network management. The data sources can be encapsulated into data source containers (420). Each data source container can encapsulate a separate data source and can be mapped into an interdependent source graph (430). The interdependent source graph can include object links between the data source containers, the object links representing relationships existing between the data source containers. The interdependent source graph can be queried by traversing the interdependent source graph using data source container relationships to obtain management information about at least one of the data sources (440). Management information obtained while querying can be rendered to a management program on the management server to provide a unified view of the management information (450).

20 Claims, 5 Drawing Sheets

(56) References Cited

U.S. PATENT DOCUMENTS

| | | |
|---|---|---|
| 6,587,837 B1 | 7/2003 | Spagna et al. |
| 6,684,214 B2 | 1/2004 | Bata et al. |
| 2003/0050915 A1* | 3/2003 | Allemang et al. ............... 707/1 |
| 2005/0093770 A1* | 5/2005 | de Bonet et al. ............... 345/10 |
| 2005/0108206 A1 | 5/2005 | Lam et al. |
| 2006/0167856 A1* | 7/2006 | Angele et al. .................. 707/3 |
| 2006/0235838 A1* | 10/2006 | Shan et al. ..................... 707/4 |
| 2007/0150562 A1* | 6/2007 | Stull et al. ..................... 709/223 |

FOREIGN PATENT DOCUMENTS

| | | |
|---|---|---|
| KR | 10-2002-0007561 A | 1/2002 |
| KR | 10-2009-0113538 A | 11/2009 |

* cited by examiner

HETEROGENEOUS DATA SOURCE MANAGEMENT

BACKGROUND

Managing services in networked environments often may involve acquiring information from multiple diverse sources. The information can be collected from the sources and processed to determine whether or not the current state of the service conforms to a desired policy or set of policies. If the state does not conform to one or more policies, changes to a service's configuration or to a resource level may be made.

Examples of diverse data sources from which information may be acquired include: live performance data from applications and operating systems in a network environment, historical business performance data, application and operating system logs, Configuration Management Databases (CMDB), application configuration models (e.g. SAP system landscape models, etc.), infrastructure models, customer data including Customer Relationship Management system (CRM) and billing data, and so forth.

A common approach to collecting data from various data sources is to write specific integration code to extract data from each particular data source. The data can then be presented as a fixed model in which relationships between the components of the model are fixed by the integration code. However, writing code for each data source can be time consuming, error prone, and expensive. A model in which the relationship between components is fixed a priori is inflexible. Such a model is unlikely to be suitable for a wide variety of management applications because systems and administrators cannot always predict which information or relationships are going to be needed by management applications and policies. This means that management applications have to do complex processing on the data and/or model to deduce the relationships of interest to the management application. Writing code to do this processing can also be time consuming, error prone, and expensive.

DETAILED DESCRIPTION OF EXAMPLE EMBODIMENT(S)

Figure 1:
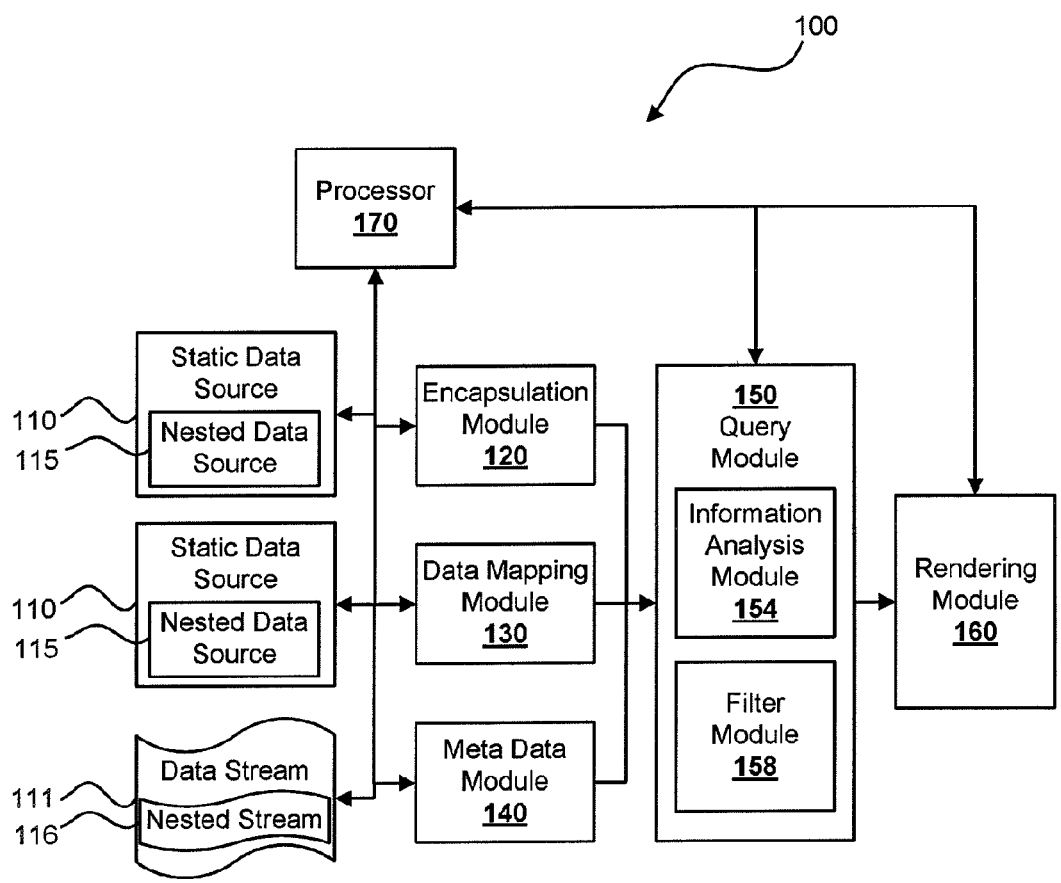
FIG. 1 is block diagram of a system for managing a plurality of heterogeneous data sources in accordance with an embodiment.

Reference will now be made to the exemplary embodiments illustrated, and specific language will be used herein to describe the same. It will nevertheless be understood that no limitation of scope is thereby intended. Additional features and advantages will be apparent from the detailed description which follows, taken in conjunction with the accompanying drawings, which together illustrate, by way of example, features of the data source management systems and methods.

Some previous efforts at data source management have integrated data from multiple sources. An abstraction of the data can be created and presented to users of a Universal Configuration Management Database (uCMDB) as a database. A problem with this approach is that every application or user using the uCMDB sees the same model structure. For some applications and users, display of a different model structure would be more beneficial. In order to accommodate these applications and users, a programmer may need to write more code to navigate the model, which can result in more development time and a more complex and costly system.

Another problem with prior solutions is that the presented data abstraction is that of a database on which a user may invoke queries. Databases can be good at storing large amounts of data for analysis of trends or recordation of data. However, databases may be less suited for building a control system or a system for managing the data and/or rendering the data. There is often an abstraction mismatch between the underlying database and modern object-oriented programming languages. Further, prior solutions generally do not and cannot integrate live monitored data into a model, at least not without writing a custom data adaptor.

Systems are typically not static. New sources of management data may be introduced as service providers try to improve efficiency and gain competitive analysis. Typically service providers may write new code to integrate the new sources of management data and new management application code. This can be expensive for the reasons explained above. Accordingly, businesses and service providers desire the ability to efficiently integrate multiple different kinds of data sources without the complexity and cost of prior solutions. To address many of the drawbacks encountered with prior systems, management of heterogeneous data sources is described herein. In accordance with an embodiment, a plurality of heterogeneous data sources is identified. The plurality of heterogeneous data sources can include static data sources and management data streams received from servers for network management. The data sources can be encapsulated into data source containers. Each data source container can encapsulate a separate data source and can be mapped into an interdependent source graph. The interdependent source graph can include object links between the data source containers with the object links representing relationships existing between the data source containers. The interdependent source graph can be queried by traversing the interdependent source graph using data source container relationships to obtain management information about at least one of the data sources. Management information obtained while querying the interdependent source graph can be rendered to a management program on the management server to provide a unified view of the management information.

Referring to FIG. 1, a system 100 is shown for management of heterogeneous data sources in an example implementation. The system may comprise various data sources 110, 111, such as those described above. The data sources can be heterogeneous and can be received from nodes on a network. For example, the data sources may comprise static data sources 110 and live data sources or streaming data sources 111. The data sources may comprise management data for managing the network. An example of a streaming data source may be a monitored central processing unit (CPU) load for a server with a particular Internet Protocol (IP) address. An example of a static data source may be a customer database comprising customer information such as name, address, phone number, orders, etc.

The system may comprise an encapsulation module 120. In one aspect, the encapsulation module, as well as other modules described below, can reside on a management server in the network. The management server can provide automated network management or may receive management instructions from a user or from another network device in communication with the management server. The management server may be configured to provide management data to a user display through a graphical user interface.

The encapsulation module 120 can be configured to encapsulate the data sources 110 into data source containers. In one aspect each data source container can encapsulate a separate data source. A data source container may comprise a class, a data structure, an abstract data type (ADT), etc., whose instances can be collections of other objects. In other words, the containers can be used to store objects (e.g., data sources) in an organized way and according to specific access rules. The containers may comprise a data structure, such as a list, map, set, array, tree, etc. The data sources encapsulated in the containers may be the data structure comprised by the container, or the containers themselves can be organized as a data structure. In one aspect, the data source encapsulation does not entail an actual copying or reproduction of data sources into a management system, but can be an identification of the data sources and structure within the data sources to provide access to desired data when queried by a query module 150.

The system may comprise a data mapping module 130. The data mapping module can be configured to use a processor 170 to map data source containers into an interdependent source graph with object links between the data source containers. The interdependent source graph can be the data structure into which the containers are organized, as referenced above. The object links between the data source containers can represent relationships existing between the data source containers. In one aspect, the interdependent source graph may be a metadata tree. While the following discussion focuses on description of the interdependent source graph as a metadata tree for convenience, the interdependent source graph may comprise any other suitable linked data structure.

The metadata tree can include each of the data sources in the system. The data sources can be organized and arranged within the tree according to the relationships between the data sources. A hierarchy of the metadata tree can be determined by the data mapping module. For example, one or more of the data sources 110, 111 may be a parent data source and may include a nested data source 115, 116. The nested data sources may comprise branches of the metadata tree from the parent data source. The nested data sources can be dependent on the parent data source, and thus the object links between parent and nested data sources in this example can represent dependencies among the data sources. The dependencies can be container properties of the parent data source and can represent properties of nested data sources.

The nested data sources 115, 116 may include data sources accessible through the parent data source 110, 111. In alternative embodiments, the nested data sources may comprise subsets of data within the parent data source. For example, the parent data source may be a database. The database may be organized with customer information, network usage information, sales information, billing information, or any other type of desired information. In this example, customer information may comprise a nested data source within the parent data source database. The customer information nested data source may further comprise additional nested data sources, such as customer identification number, customer name, customer address, etc. In one aspect, nested data sources can be used to refine a larger set of data into a smaller subset of data. Any desired level of refinement may be created in the metadata tree. In one aspect, the refinement level can be created according to the level of refinement already present in the data source and/or nested data source.

The system can include a query module 150. The query module can be configured to query the interdependent source graph. The query module may use a same or different processor 170 as the other modules to query the interdependent source graph. Though only one processor is shown in FIG. 1, the system may comprise any number of processors in any desirable configuration and with any variety of communication links between the various modules, data sources, etc.

In one aspect, the query module 150 can traverse the interdependent source graph to obtain management information about at least one of the data sources. The query module may be configured to traverse the interdependent source graph using object oriented notation. In one aspect, the object oriented notation may be in the Groovy programming language. Groovy can be a convenient language to represent not only the policies that describe behavior of domain entities, such as the data sources, but also to model the entities themselves into the interdependent source graph. As such, Groovy can enable a single, integrated language environment. Use of an object oriented language such as Groovy can result in a model which is more easily created, understood, or managed because complex behavior and protocols can be hidden behind simpler method calls.

The system can include a rendering module 160. The rendering module can be configured to render the management information obtained from querying to a management program on the management server. Any variety of management programs may be suitable for data management. Some examples of management programs include SAP System Landscape Directories, uCMDB, etc. As has been described, the management program can provide information to a user through a user display device using a graphical user interface. The rendering module can render the management information to the graphical user interface where the information can be viewed, managed, and otherwise manipulated by the user. In one aspect, the management information can be rendered to provide a unified view of the management information. In other words, the rendering module can render information from a plurality of data sources to appear as a single data source. Which information is rendered and how the information is rendered can depend on the query, user specification, user identity, etc. In one example, different applications or users using the management program may be able to see a different model structure of the various data sources and or data rendered from the data sources. Information rendering will be discussed in further detail below.

The system can include an information analysis module 154. The information analysis module can be configured to analyze obtained management information using a processor 170. The information analysis module can analyze information obtained through querying to obtain a result. The obtained result may comprise the information rendered to a user through the rendering module 160. In one aspect, the information analysis module can analyze the obtained management information to obtain a result which does not match an existing nested data source property and can create a nested data source property for the result.

In one embodiment, creation of a nested data source property may be as follows. In a database containing information about a person, including the person's name and date of birth, an administrator may also wish to be able to identify and/or organize information about the person or a group of people according to age. As there is no field in the database for age, the information analysis module can compare a date of birth to the current date to determine an age of the person or group of people. This determination can be used for a single query, or may also be stored for subsequent use. The information analysis module can add an additional property to the data source container identifying age as an additional nested data source, or as an additional field within the database. Further, the information analysis module can be configured to add the "age" information to the database within an "age" field to be accessible for future queries. As an alternative, in some systems the information analysis module may not have access to store information to the data source, so the information analysis module could instead store the "age" information in a different database accessible by the management server. In this example, the data source container property for the "age" field would direct a query to the different database when an "age" query is presented. In another aspect, the "age" information can be virtually added to the system and exposed using the metadata. In a performance improvement process in accordance with this aspect, the "age" information may be stored in an intermediate store, which can assist in avoiding costly calculations. In this example, the "age" information is not stored in the database because the underlying data can change. When the underlying data changes, the system may re-compute stored data values to ensure accuracy. Because the underlying data can change, storing the data values in the database can avoid re-computation of values. However, storing a value in the database may result in an incorrect value when retrieved at a later time because the underlying data can change. Re-computing the data value when the data value is desired can guarantee that the data value is correct. In a further aspect, the system may be configured to determine an amount of re-computation necessary for the information to determine whether to store the information in the database. For example, if re-computation would involve a lengthy process the data value may be cached in the database.

The system can further include a filter module 158. The filter module can be a part of the query module or be in communication with the query module and may be configured to filter obtained management information. Filtering obtained management information can limit the management information rendered on the management program to result in fewer system resources used in querying, rendering, analyzing, processing, etc., as well as lead to shorter times to provide the information to the user. Filtering will be discussed in further detail below.

The system can include a metadata assignment module 140. The metadata assignment module can be configured to assign metadata to heterogeneous data sources 110. The metadata can create a correspondence between nodes of the interdependent source graph and data in the plurality of heterogeneous data sources. In other words, the identification of data sources and structure within the data sources to provide access to desired data as described above in terms of encapsulation of data sources can be accomplished through the use of metadata. The metadata can be used to limit, search through, or otherwise access or reference data stored in the data sources.

Figure 2:
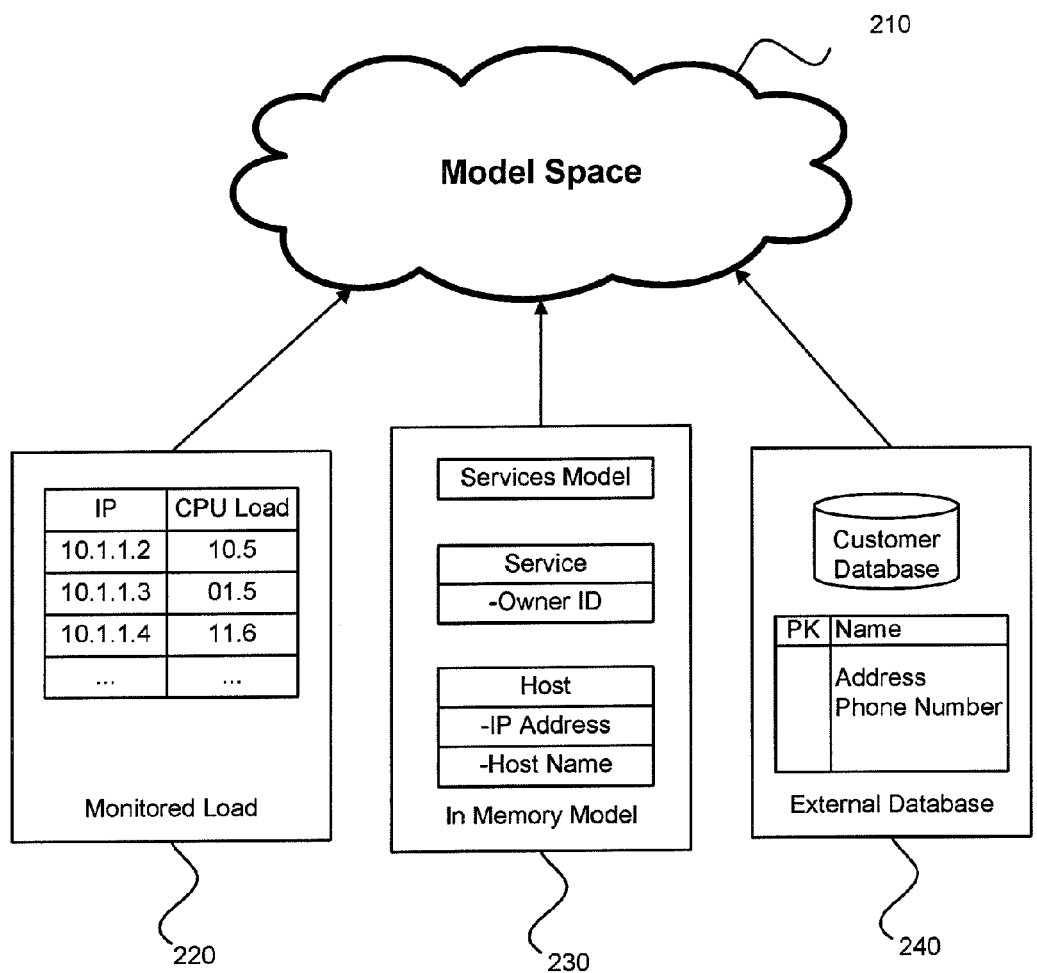
FIG. 2 is a block diagram of a model space used in managing a plurality of heterogeneous data sources in accordance with an embodiment.

Reference will now be made to FIG. 2 in which a model space 210 can be used in managing a plurality of heterogeneous data sources 220, 230, 240 is shown in accordance with an embodiment. The model space is an integration of a diverse set of data sources into a single coherent model using the interdependent source graph, data source containers, and other elements described above. The model can be used in a variety of applications. One example use of the model is for application in automated policies of management programs which use a presented abstraction layer to reason about a deployed infrastructure and take appropriate actions based on an observed system state.

As a simple example, a sample policy may first have a condition and secondly an action to be executed if the condition is true. The policy can share the same computational expressiveness as event condition action systems. The sample policy can be used by a management server to observe a pool of web servers 220 through the model space. If the average CPU utilization of the pool over a predetermined period exceeds a predetermined threshold, the system can perform a scale up of CPUs or servers used using a service manager.

The interdependent source graph can be a customizable schema that defines the properties and relationships between different data source entities. When using existing data sources, data organization schemas from those data sources can be used in creating the interdependent source graph. If a data source entity is served from a relational database, each entity can be treated as an object whose attributes are defined by the table schema of the database. If the data source entity is already in an object format, the data source entity can be mapped directly into the model space. In addition, the metadata module can be used to add arbitrary properties and nested properties to sets of data sources and/or containers of data sources. This means the model space is not limited to schemas existing in the data sources.

The metadata can describe where the data sources come from, which additional attributes to express, and how entities are related to one another. FIG. 2 shows an example of such a dynamically created model space. The model space can provide live (ever changing) monitored data 220 that is provided by a monitoring solution. In addition, FIG. 2 shows an in memory model representation 230 of a number of services. Each service may be comprised of a number of individual hosts running a particular software stack or application suite. Furthermore, FIG. 2 shows an additional relational customer database 240 that holds information about individual customers. Management policies can be used for and related to any information in the model space that is presented in a consistent way without understanding the details of where the data comes from. Additionally, the management policies can be used for presenting multiple different views over the same data.

Use of metadata to create the model space can also enable flexibility to incorporate events into the model space. The model space can include an abstraction layer in which certain conditions can be registered. When the conditions are satisfied, the management program can notify a service, device, or user, as applicable. The abstraction layer can be useful in avoiding a pull-based solution which queries the model space in certain intervals for conditions. A push solution that notifies when conditions are met can use fewer system resources and result in a faster, more efficient system.

Each entity or object, residing in a data source, that is accessed in the model space can have a set of properties. Similar entities can be grouped into sets. These sets can be predetermined in any desired manner. In one aspect, the sets are determined by purpose of the entities. For example, every physical machine in a datacenter may collectively form a set. Sets may also be based on an arbitrary selection. For example, a set may comprise entities that represent Apache Unix web servers deployed on physical or virtual machines. Use of sets can enable easier navigation through the model space. Instead of inspecting individual entities, a whole set of entities can be examined at once. Each entity can be represented as a tuple of named key value pairs. Navigating through the interdependent source graph of the model space can be accomplished by adding or removing keys from a tuple or by adding or removing entire tuples from the resulting output.

In one aspect, two sets of entities can be joined together to produce a union which can be specified to satisfy specific conditions. Using these specifications, the interdependent source graph can be fashioned to describe how sets of entities are linked together. This can allow for cycles in the interdependent source graph. The query module may be able to traverse the interdependent source graph for a relatively long time while limiting the amount of metadata specification because the system can harness recursion.

Metadata can be input into the query module. A query interface and query language can be used by the query module to navigate through an entity set and apply constraints along the way. The management program can utilize the query interface to reason about the current configuration of a system and in return apply appropriate actions to one or more systems. In a system comprising multiple management programs, the management programs can each use either the same metadata specification or use a custom specification which is tailored to the specific use case of an application. Regardless, all of the management programs can ultimately operate on the same underlying data. The model space can be used to export only a limited set of all existing entities that are of particular interest without changing the underlying data. Additionally, the model space can be used to add properties or even nested properties to entities to extend the individual entities with additional desired information.

Traditional databases can be limited on expressiveness of views of rendered data at least in part due to limitations in using Structured Query Language (SQL) and other database specific specifications, and thus may have limited functionality as compared with the present system. The present system can use an existing programming language, such as Groovy running on top of Java for example, giving a much broader and flexible use-case scenario. Furthermore data can be pulled in from virtually any source that exports entities with properties and has the ability to iterate over those properties. This leads to a strong separation of metadata and actual rendering or usage of information to provide great flexibility.

The following example of metadata usage is based on FIG. 2 and joins a customer database holding records of customers in a relational database 240 with in memory models 230 holding the state of deployed services and associated hosts as well as monitoring data 220 which exists in an external tool (such as the open source Ganglia tool or any other suitable data monitoring tool).

```
...
customers(source: customerdb) {
    services(join : new Equals(left:"name",right:"ownerid")) {
        renderAs("/root/services")
    }
    hosts(generator: {it.vm}) {
        //From customer-> hosts via services
        intermediate(
            join: new Equals(left:"name",right:"ownerid'),
            generator: {servicesModel.services})
        renderAs("/root/hosts")
    }
services(generator: {servicesModel.services)) {
    hosts(generator: {it.vm}) {
        renderAs("/root/hosts")
    }
    customers(join : new Equals(left:"ownerid",right:"name")) {
        renderAs("/root/customers")
    }
}
```

-continued

```
}
hosts( generator: {servicesModel.services. collect{it.vm}.flatten( )}) {
    monitors(operator : {new
    HostMonitors([hostname:it.hostname,ipAddress:it.ipAddress])})
}
...
```

Figure 3:
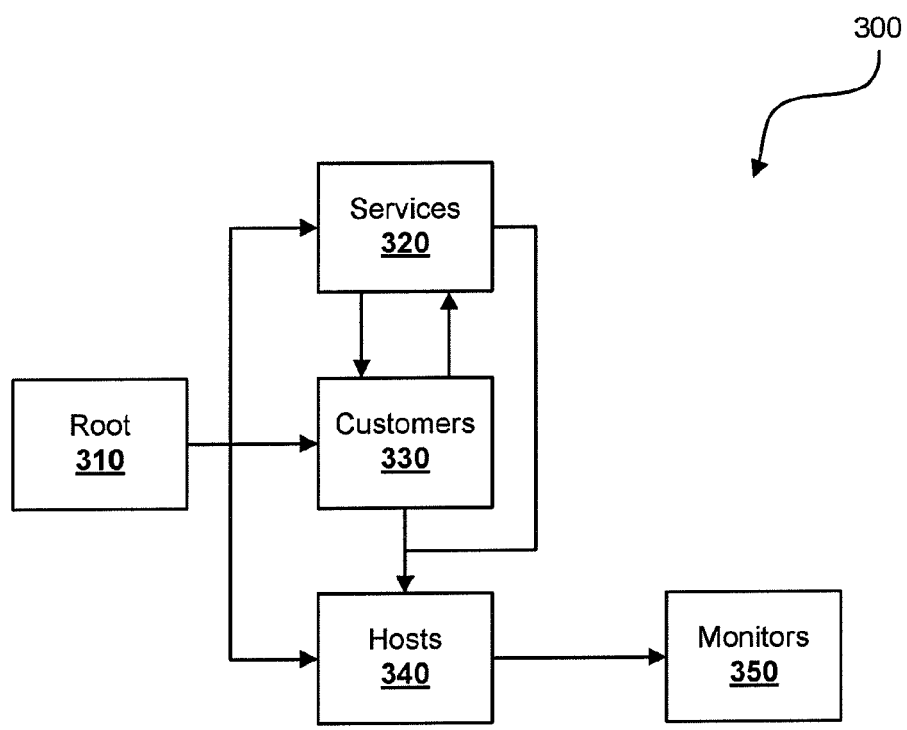
FIG. 3 is a block diagram example of relationships among data source containers.

FIG. 3 represents a block diagram representation 300 of the metadata used for the model space of FIG. 2. Root 310 can be the base of a metadata tree in the model space. Services 320, customers 330, and hosts 340 can all be nodes depending from root. Customer information can come from one data source (e.g., database 240 of FIG. 2), while the services and hosts information may come from a different data source (e.g., in memory model 230 of FIG. 2). The services and customers nodes may be joined as children of the other node, and hosts may be joined as a child of either the services or customers node. Monitors 350 (e.g., the monitors providing live data for monitored load 220 of FIG. 2), can be joined as a child node of the hosts node. Additional description of usage and relationships of nodes and data sources follows by considering the following discussion in connection with FIGS. 2 and 3.

The metadata tells the rendering module how to render entities and how they are connected. Programmers can navigate through this tree by constructing object path expressions such as: root.customers.filter({name="[customername]"}) .services.hosts. The construction of the path defines the information or view that will be seen. The available paths and hence available views can thus be defined by the metadata. Top level nodes in the metadata for this example may be root.customers, root.services and root.hosts.

Each of the nodes can specify where the entities are stored and how the entities are accessed. The customers can be stored in a customer database referenced by the source parameter. The hosts as well as the services can be stored in memory in an object tree. To access the individual entities, the entities can be transformed into sets using the dynamic nature of Groovy. A closure can be specified which will render the entities into datasets when needed. The sets can be top level nodes on which further nodes can computed. Entities (tuples) from the sets can be passed along the tree, generated anew, further refined and/or discarded.

An example query using the sets and nodes may be as follows. The query root.customers.services could express a query to show all customers and services associated with the customers. The query module can compute the first results from the "customers" database, after which the query could descend into the child node "services". In this example, the entities to be reported (e.g., "services") are dependent on which customers have been selected. Thus, the appropriate data is not readily available but can be provided by joining two sets of entities using a predicate. The predicate enables the query to obtain services information for a particular customer. The predicate can be specified using a "join" attribute to specify that two entities belong together. If two entities satisfy the predicate, a new entity or data source container can be created which holds the union of the properties specified by both base entities. An "Equals" operator in the predicate can be used for specifying two data source container properties having a same value. When executing the predicate, the left side of the predicate can be set to the parent entity and the right side can be set to the child entity. The example root.customers.services reads that for a given customer record in the customer database 240 (FIG. 2), an associated service from the in memory model 230 (FIG. 2) can be found by matching the attribute name for the customer with the attribute ownerid of the service.

To efficiently specify the recursion in the interdependent source graph or metadata tree, a keyword "renderAs" can tell the query module to continue evaluation at the point in the tree specified. This can also reduces the specification of redundant information. The previous example does not explicitly specify a source attribute for the services set, but instead is indirectly specified by the customer set and thus found if the "renderAs" declaration is followed. By using the "renderAs" syntax complex queries can be constructed which can hide an underlying complexity.

In another example query, root.customers.services.hosts, would report for every customer the services owned by the customer and a list of hosts associated with each of the services owned by the customer. The "renderAs" keyword resets the query module to the services node by simply treating the argument of the "renderAs" statement as a path expression. To descend down into the host node, the generator keyword as specified would generate for every tuple which associates a customer with a service an iterable list of hosts by reaching out into the memory model. Here the host node may be "unaware" that a list of customers was computed first before asking each of the customers' services for the associated hosts instead of just traversing the tree from the services point, which may result in loss of the information about the customers associated with each service. Each of the nodes in the model space data is free of querying or computational side effects. In other words, a computation starting point does not matter in order to obtain the same results.

Sometimes all associated entities for a given entity are not found in a single step. This may be the case if the entities are not directly connected, but linked through one or more intermediate sets as referenced above. To express these cases, an intermediate keyword can be used. For example, when trying to find all hosts that are running for a given customer, such information is not stored directly. Instead, the query module can first find all services associated with a customer and use the result to find hosts registered with a particular service. Each intermediate node declaration in the metadata can be treated as a keyword. The query module can be configured to check whether an intermediate result ought to be computed before processing a node or a query. If the query module determines that an intermediate result ought to be computed, the intermediate result can specify a source set of entities and a join predicate which will determine how the intermediate results are built. Essentially, a new entity can be created which shares all of the attributes from the corresponding entities. In this example, an intermediate entity can be constructed which holds all of the information about a particular service from the memory model and the customer using it as identified in the customer database by using a join predicate on the customer name and the service. Since there is now a direct connection between the customer and the service, entities can now be found which provide the hosts information for the service, and since the service is linked to the customer in the intermediate step, the question of which hosts are running for a particular customer can be answered and the data can be rendered.

The model space can also enable adding additional attributes to entities where the additional attributes can be traversed. As an example, monitoring information can be added to a host. This can be expressed by using a normal node statement. By declaring the node monitors as a child of the hosts node 340 (FIG. 3), a valid property can be generated for every entity in the hosts set called monitors 350 (FIG. 3).

Instead of accessing another data source, an operator attribute can be specified for the host to dynamically reach out into the monitoring environment and call an appropriate Application Programming Interface (API) to get the latest monitoring results. Using the dynamic nature of Groovy, the code can be stored inside a closure that can be evaluated using an operator keyword when this property is accessed. A difference from a generator statement is that the generator statement generates a set of entities that can be enumerated from a data source, whereas the operator keyword only applies a function to one or more of the attributes of a single entity. A generator statement could be used, for example, to incorporate a log file into the model space. In this example, the generator statement would turn each line of the logfile into an entity. In contrast, if an entity has a field for "birthday", the operator statement can be used to dynamically calculate age based on the current date and this particular property.

A simple query language based on the Java property syntax or Groovy GPath expression can be used to enable simple access to data entities as well as for inspecting and finding entities as has been shown in the examples above. The language can be kept simple to reduce system administration costs and push complex computation into the query module to hide the complexity. Each query in the query language can be expressed by concatenating operators. Some example operators are as follows.

An attribute inspection operator can be used to inspect a particular attribute of a given entity. For example, root.hosts.ipAddress would return the IP address of all hosts that are known at the time of querying.

Another operator can be used to follow a render node. To navigate through the view expressed using the metadata, node declarations can be concatenated. For example, root.services.hosts would return all hosts that are associated with services.

An operator can be used to reduce an attribute count in a result set. To return only specific attributes of an entity when querying, a "select" statement can be used which operates similarly to the SELECT statement in SQL. For example, the query root.hosts.select("hostname","ipAddress") would return all known hosts, but limit the output to only report a host name and an IP address for each host.

An operator can be used to filter entities. Specifying a predicate that acts as a pass filter for every entity can reduce the number of entities returned by a query. Only entities satisfying the predicate are returned. For example, to find all hosts with a CPU load greater than a threshold, the query root.hosts.filter{monitors.cpuload>threshold) can be used. A filter can be applied anywhere in the statement. Each filter argument can be a Boolean closure which is interpreted dynamically for every entity which exists at the current query tree. The query module can use the filter module to enumerate all hosts first and execute the filter for every host. The filter can be initialized at a current position in the metadata tree and branches of the tree can be individually traversed for each filtered instance. Since the filter can operate as a Boolean pass/no pass filter, in this example information about the CPU load for each host may not be available, and the query would return information that the CPU load value for each monitored host is exceeding the threshold. To be able to also see what the actual load is, a new attribute can be dynamically added into each host entity which represents the CPU load value.

Accordingly, an operator can be used to add an attribute to entities. To dynamically add an attribute to a given entity, a function method can be used. The function method can be used to apply a function onto an attribute and filter based on the outcome of the function. A function as specified in an operator statement would by definition return a single value. For example, a person entity with attributes for address and birth year could return for a function to calculate the age based on the current date and represent the current age in years. To evaluate this attribute later, the result of the function can be stored as a new attribute into the object. The function method can execute a parameter specified closure for each encountered entity and store the result into the entity under a specified name. This allows the result to be evaluated in later queries or analysis. For example to find all customers which have machines (hosts) running whose average CPU utilization is above a certain threshold, the CPU load for every host using the function method can be obtained and stored in a new attribute for each host. The new attribute could be called CPUload. Afterwards a filter can be used on the newly created CPUload attribute to exclude less loaded hosts. Thus, the attribute can be treated like any other attribute. The following query could achieve this result: root.customers.hosts.function({monitors.cpuload},"cpuload")
.filter{cpuload>threshold}.

The query module can handle the execution of each query. Since the query can be analyzed before execution, the model space can provide a great performance benefit in generating an execution plan for each query to minimize a number of intermediate results generated and increase speed of execution time of each query. Because the data source management system can build a layer of metadata on top of existing data sources, pushing down the computation and intermediate result elimination into the appropriate data sources where possible can assist in decreasing query execution time.

Figure 4:
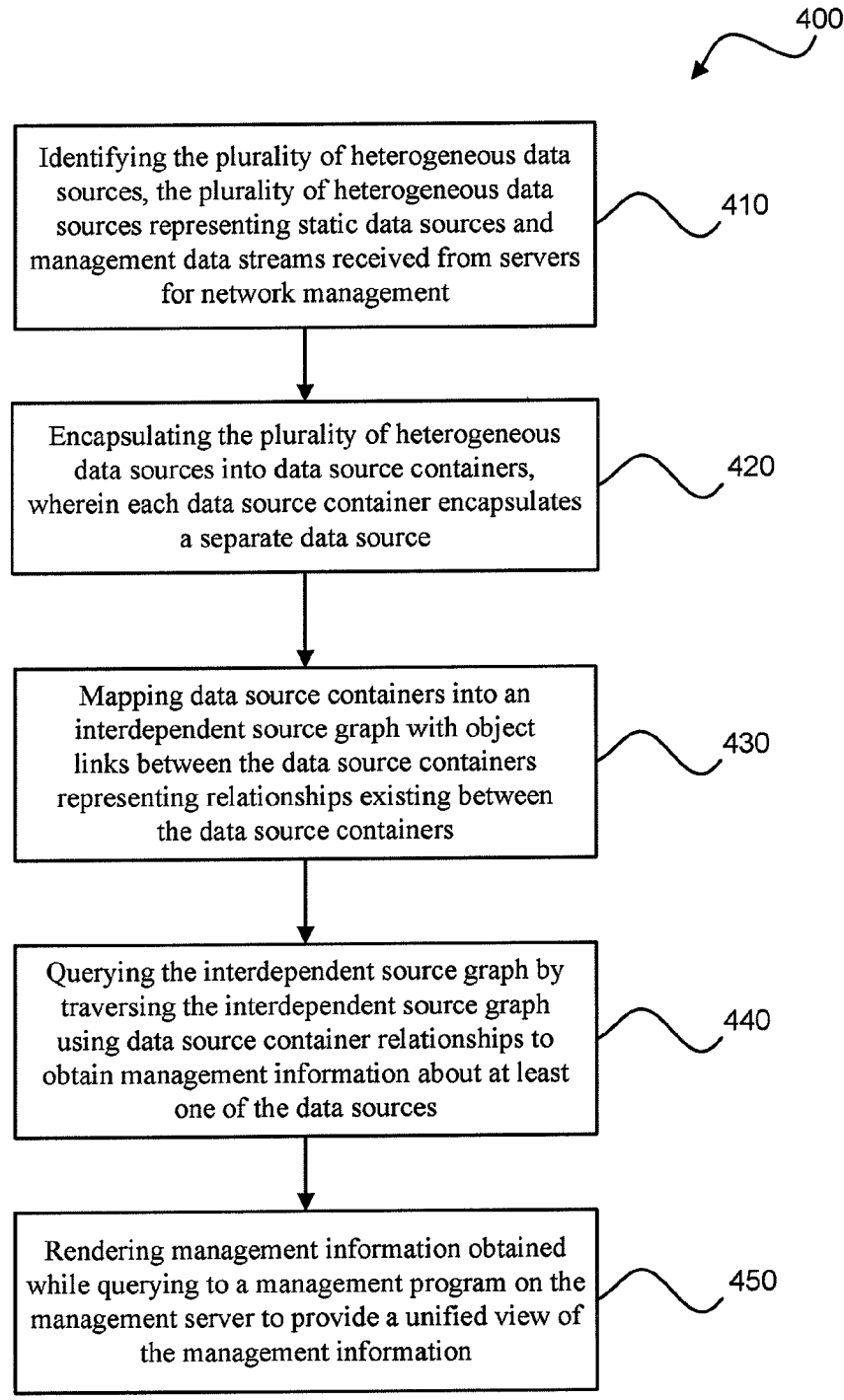
FIG. 4 is a flow diagram of a method for managing a plurality of heterogeneous data sources in accordance with an embodiment.

Referring now to FIG. 4, a method 400 is shown for managing a plurality of heterogeneous data sources. The plurality of heterogeneous data sources can be identified 410. The plurality of heterogeneous data sources can represent static data sources and management data streams received from servers for network management. The plurality of heterogeneous data sources can be encapsulated 420 into data source containers. In one aspect, each data source container can encapsulate a separate data source. Data source containers can be mapped 430 into an interdependent source graph with object links between the data source containers. The object links can represent relationships existing between the data source containers. The interdependent source graph can be queried 440 by traversing the interdependent source graph using data source container relationships to obtain management information about at least one of the data sources. Management information obtained while querying can be rendered 450 to a management program on the management server to provide a unified view of the management information. This view can be a user, application, or device specific view, as has been described.

In accordance with further embodiments, the method can include joining a plurality of data source containers based on attributes that are common to each data source. In a more detailed aspect of this embodiment, the method can include generating a plurality of data tuples in response to the joining of the plurality of data source containers. Data tuples can be filtered from the plurality of data source containers using metadata filters to obtain desired query data. The metadata used in filtering may comprise data source predicate information.

In accordance with another embodiment, the method further comprises joining a plurality of data source containers to form an intermediate data source container with intermediate relationships with existing data source containers. Querying 440 also can further comprise obtaining management information about a data source container related to one of the joined data source containers as the management information relates to a different data source container related to a different one of the joined data source containers by using the intermediate relationships of the intermediate data source container.

This embodiment may be alternately described as follows. First, at least two data source containers can be joined to form intermediate container. Querying 440, as described above can be further refined as follows. In considering a first of the at least two joined containers, the first container can have existing relationships to other data source containers and/or data in other data source containers. This embodiment relates to data from one or more of these other data source containers. In considering a second of the at least two joined data source containers, the second data source container can have existing relationships with other data source containers which may be different data source containers than those related to the first data source container. Data from a data source container related to the second data source container can be combined with the data from the first data source container or from the data source container related to the first data source container. Doing this can enable creation of a relationship of otherwise unrelated data because of the joined data source containers which creates an intermediate relationship.

Figure 5:
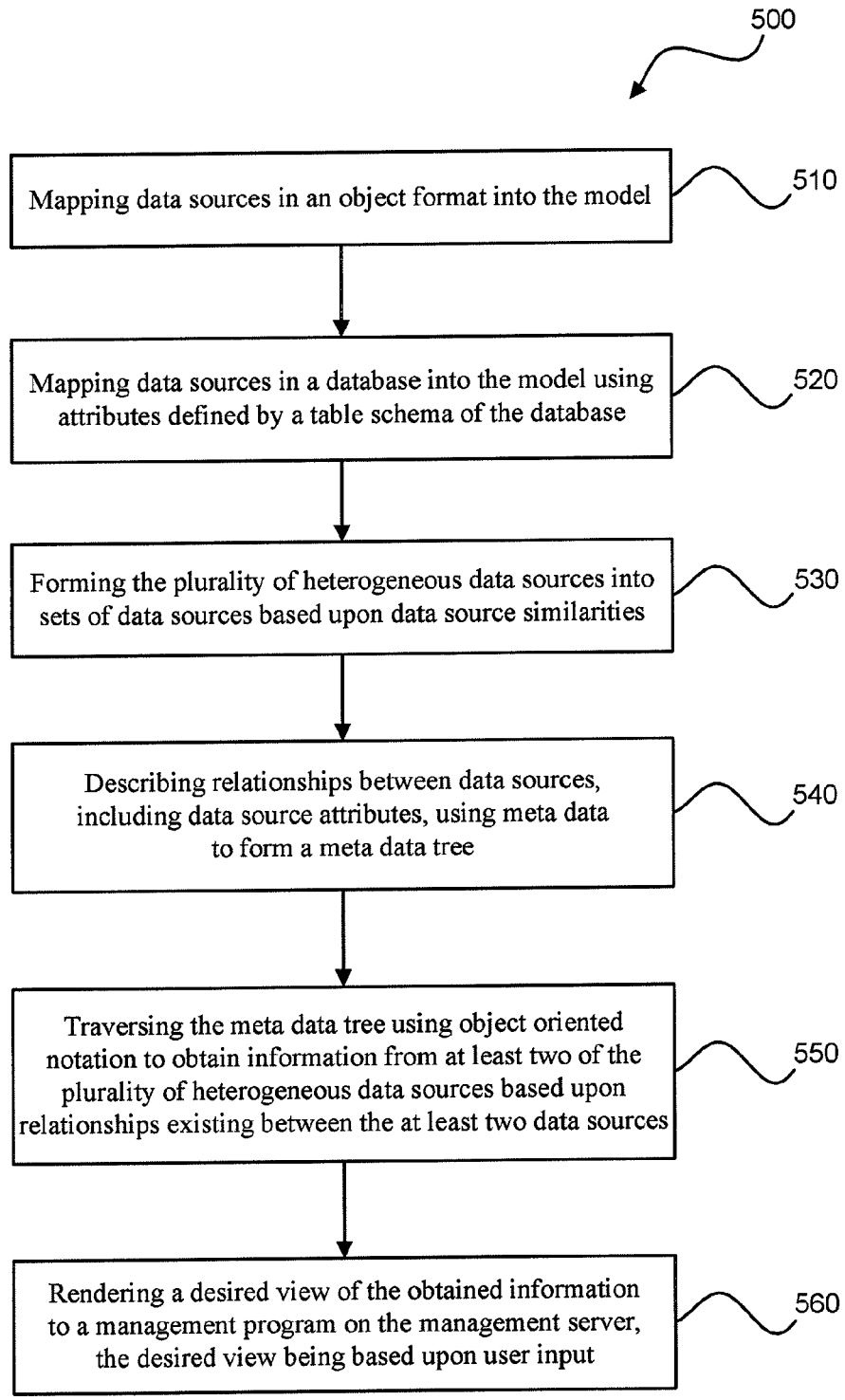
FIG. 5 is a flow diagram of a method for managing sets of heterogeneous data sources using a metadata tree in accordance with an embodiment.

Referring to FIG. 5, a method 500 is shown for managing a model for a plurality of heterogeneous data sources. The method includes mapping 510 data sources in an object format into the model. Data sources in a database can also be mapped 520 into the model using attributes defined by a table schema of the database. The plurality of heterogeneous data sources can be formed 530 into sets of data sources based upon data source similarities. Relationships between data sources, including data source attributes, can be described 540 using metadata to form a metadata tree. The metadata tree can be traversed 550 using object oriented notation to obtain information from at least two of the plurality of heterogeneous data sources based upon relationships existing between the at least two data sources. A desired view of the obtained information can be rendered 560 to a management program on the management server. In one aspect, the desired view can be based upon user input.

Different management programs can have their different model spaces which can be rendered from the same underlying data sources. Construction of management programs is made easier because the model space just reveals specified data. Unnecessary data does not need to be included in the model space, which can further reduce complexity. Further, new data sources can be added to the model space without changing existing management programs. New management programs can be written with new model spaces where the new management programs and/or new model spaces are configurable to incorporate both new and old data sources. The model space advantageously is able to render live monitoring data, restrict views by query/filter, use relational algebra to hold off calculating queries, and integration any data source that can be wrapped as an object.

The data source management described herein provides a flexible and straight-forward way for reasoning over any data. Customizable views over distinct data-sources can be presented, which can make the writing of complex policies easier and comprehensive. The views can be customizable based upon the needs of a particular management program. The model space can be used to express multiple different views onto the same data source and to trim the space of all the data available down to only the needed aspects of a system for a particular view.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for managing a plurality of heterogeneous data sources, comprising:
   identifying the plurality of heterogeneous data sources, the plurality of heterogeneous data sources representing static data sources and management data streams received from servers for network management;
   encapsulating the plurality of heterogeneous data sources into data source containers, wherein each data source container encapsulates a separate data source;
   mapping data source containers into an interdependent source graph with object links between the data source containers representing relationships existing between the data source containers;
   querying the interdependent source graph by traversing the interdependent source graph using data source container relationships to obtain management information about at least one of the data sources; and
   rendering management information obtained while querying to a management program on the management server to provide a unified view of the management information.

2. A method as in claim 1, further comprising joining a plurality of data source containers based on attributes common to each data source.

3. A method as in claim 2, further comprising generating a plurality of data tuples in the interdependent source graph in response to the joining of the plurality of data source containers.

4. A method as in claim 3, further comprising filtering data tuples from the plurality of data source containers using metadata filters to obtain desired query data, wherein the metadata filters comprise data source predicate information.

5. A method as in claim 1, wherein the interdependent source graph is a metadata tree.

6. A method as in claim 1, further comprising forming nested data source nodes in the interdependent source graph for the data source containers, wherein the nested data source nodes are nested data source containers representing nested data sources within one or more of the plurality of heterogeneous data sources.

7. A method as in claim 1, wherein querying the interdependent source graph further comprises querying the interdependent source graph by traversing the interdependent source graph using object oriented notation.

8. A method as in claim 1, wherein querying the interdependent source graph further comprises filtering to filter obtained management information to limit the management information rendered on the management program.

9. A system for managing a plurality of heterogeneous data sources, comprising:
   a plurality of heterogeneous data sources representing static data sources and management data streams received from servers for network management;
   an encapsulation module configured to encapsulate the plurality of heterogeneous data sources into data source containers, wherein each data source container encapsulates a separate data source;
   a data mapping module configured to use a processor to map data source containers into an interdependent source graph with object links between the data source containers representing relationships existing between the data source containers;
   a query module configured to query the interdependent source graph by traversing the interdependent source graph using object oriented notation to obtain management information about at least one of the data sources; and
   a rendering module configured to render management information obtained while querying to a management program on the management server.

10. A system as in claim 9, wherein the data mapping module is further configured to form dependencies in the interdependent source graph for the data source containers, wherein the dependencies are data source container properties representing nested data source properties.

11. A system as in claim 9, further comprising an information analysis module configured to analyze obtained management information using a processor to obtain a result for a nested data source property which does not exist and to create a nested data source property for the result, wherein the query module can query the nested data source property to obtain management information about at least one of the data sources.

12. A system as in claim 9, further comprising a filter module on the query module configured to filter obtained management information to limit the management information rendered to the management program.

13. A system as in claim 9, further comprising a metadata assignment module configured to assign metadata to the plurality of heterogeneous data sources to create a correspondence between nodes of the interdependent source graph and data in the plurality of heterogeneous data sources.

14. A system as in claim 13, further comprising a processor in communication with at least one of the plurality of heterogeneous data sources and configured to process a query from the query module by computing a result based on the query and limited by the metadata, the processor being further configured to send the result to the query module.

15. A system as in claim 9, wherein the plurality of heterogeneous data sources further comprise nested data sources representable in the interdependent source graph as nested data source containers.

16. A system for managing a plurality of heterogeneous data sources, comprising:
   a processor for communication with a plurality of heterogeneous data sources representing static data sources and management data streams;
   an encapsulation module, for operation with said processor, to encapsulate heterogeneous data sources into data source containers, wherein each data source container encapsulates a separate data source; and
   a data mapping module, for operation with said processor, to map data source containers into an interdependent source graph with object links between the data source containers representing relationships existing between the data source containers.

17. A system as in claim 16, further comprising a query module, for operation with said processor, to query the interdependent source graph by traversing the interdependent source graph using object oriented notation to obtain management information about at least one of the data sources.

18. A system as in claim 17, further comprising a rendering module, for operation with said processor, to render management information obtained while querying to a management program on a management server.

19. A system as in claim 16, wherein said interdependent source graph comprises a metadata tree.

20. A system as in claim 16, wherein said plurality of heterogeneous data sources comprises at least one parent data source with at least one nested data source in that parent data source, wherein said data mapping module uses said object links to represent dependencies among the data sources including between the at least one parent data source and at least one nested data source.

\* \* \* \* \*